United States Patent
Chen et al.

(10) Patent No.: US 7,496,340 B1
(45) Date of Patent: *Feb. 24, 2009

(54) I/Q MISMATCH CALIBRATION OF DIRECT CONVERSION RECEIVERS USING RADIO FREQUENCY NOISE

(75) Inventors: Jesse E. Chen, Sunnyvale, CA (US); Patrick Vandenameele, Bertem (BE); Steven Thoen, Leuven (BE); Alex Zenkin, Allentown, PA (US); Pengfei Zhang, Shanghai (CN); Peter Hanson, Fremont, CA (US); Dmitri Varsanofiev, San Diego, CA (US); Peter Cnudde, Sunnyvale, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 694 days.

This patent is subject to a terminal disclaimer.

(21) Appl. No.: 11/143,042

(22) Filed: Jun. 2, 2005
(Under 37 CFR 1.47)

(51) Int. Cl.
*H04B 1/10* (2006.01)
(52) U.S. Cl. .................. 455/296; 455/63.1; 455/278.1; 375/254; 375/231; 375/346
(58) Field of Classification Search ............. 455/226.1, 455/424, 425, 456.5, 456.6, 550.1, 575.1, 455/67.11, 63.1, 67.14, 114.2, 114.3, 115.1, 455/278.1, 296; 375/142, 150, 144, 145, 375/254, 329, 326, 345, 319, 350, 373, 322, 375/346, 285; 714/25; 702/196; 341/118, 341/119, 120, 144, 155; 370/203, 338, 527, 370/236, 232
See application file for complete search history.

(56) References Cited

U.S. PATENT DOCUMENTS

| | | | | |
|---|---|---|---|---|
| 5,949,821 A * | 9/1999 | Emami et al. | ................ | 375/235 |
| 6,330,290 B1 * | 12/2001 | Glas | ........................... | 375/324 |
| 6,442,217 B1 * | 8/2002 | Cochran | ..................... | 375/326 |
| 6,574,286 B2 * | 6/2003 | McVey | ....................... | 375/308 |
| 6,707,860 B1 * | 3/2004 | Sevenhans | .................. | 375/319 |
| 7,008,765 B1 * | 3/2006 | Bussemakers et al. | ......... | 435/6 |
| 7,076,008 B2 * | 7/2006 | Jeong | ........................ | 375/345 |
| 7,123,896 B2 * | 10/2006 | Chiu | ........................... | 455/313 |
| 7,130,359 B2 * | 10/2006 | Rahman | ..................... | 375/316 |
| 2003/0007574 A1 * | 1/2003 | Li et al. | ...................... | 375/316 |
| 2003/0088386 A1 * | 5/2003 | Oustry | ...................... | 702/196 |
| 2003/0135532 A1 * | 7/2003 | Peting | ........................ | 708/622 |

(Continued)

*Primary Examiner*—Edward Urban
*Assistant Examiner*—Charles Chow
(74) *Attorney, Agent, or Firm*—Withrow & Terranova, P.L.L.C.

(57) ABSTRACT

A system and method are provided for calibrating for an I/Q mismatch of a direct conversion receiver based on a random signal having a two-dimensional I versus Q trajectory, such as radio frequency (RF) noise. In general, the random signal is received and downconverted to a quadrature baseband signal having an in-phase component and a quadrature component. The variance of the in-phase component, the variance of the quadrature component, and the covariance of the in-phase component with the quadrature component are computed based on samples of the quadrature baseband signal. A correction matrix used to compensate for the I/Q mismatch of the receiver and/or I/Q mismatch including a gain mismatch and a phase mismatch of the receiver is then computed based on the variance of the in-phase component, the variance of the quadrature component, and the covariance of the in-phase component with the quadrature component.

24 Claims, 5 Drawing Sheets

U.S. PATENT DOCUMENTS

| | | | |
|---|---|---|---|
| 2003/0174079 A1* | 9/2003 | Soltanian et al. | 341/118 |
| 2004/0268180 A1* | 12/2004 | Sano | 714/25 |
| 2005/0047384 A1* | 3/2005 | Wax et al. | 370/338 |
| 2005/0135521 A1* | 6/2005 | Nemer et al. | 375/350 |
| 2005/0260949 A1* | 11/2005 | Kiss et al. | 455/67.14 |
| 2006/0067424 A1* | 3/2006 | Wolf | 375/296 |
| 2006/0133548 A1* | 6/2006 | Oh et al. | 375/346 |
| 2006/0233231 A1* | 10/2006 | Yen et al. | 375/233 |
| 2007/0025474 A1* | 2/2007 | Moorti et al. | 375/329 |
| 2007/0123188 A1* | 5/2007 | Mo et al. | 455/302 |

* cited by examiner

US 7,496,340 B1

I/Q MISMATCH CALIBRATION OF DIRECT CONVERSION RECEIVERS USING RADIO FREQUENCY NOISE

FIELD OF THE INVENTION

The present invention relates to direct conversion transceivers, and more particularly to baseband correction of an I/Q mismatch of a direct conversion receiver.

BACKGROUND OF THE INVENTION

Most direct conversion radio frequency receivers require baseband correction for a mismatch between the in-phase (I) and quadrature (Q) paths, which is referred to as I/Q mismatch. The receiver downconverts a quadrature baseband signal from a radio frequency signal to a quadrature baseband signal. More specifically, the receiver includes a first mixer that mixes the radio frequency signal with an in-phase component of a local oscillator signal to downconvert the radio frequency signal to an in-phase component of the quadrature baseband signal. Similarly, the receiver includes a second mixer that mixes the radio frequency signal with a quadrature component of the local oscillator signal to downconvert the radio frequency signal to a quadrature component of the quadrature baseband signal.

However, the gain of the first mixer may not be matched to the gain of the second mixer. As a result, a gain error is introduced into the quadrature baseband signal. In addition, the in-phase component and the quadrature component of the local oscillator signal used by the mixers for downconversion may not be ninety degrees out-of-phase. As a result, a phase error, or quadrature error, is introduced into the quadrature baseband signal. Combined, the gain and quadrature errors form an I/Q mismatch of the receiver It is desirable to correct the I/Q mismatch of the receiver at baseband in order to provide improved performance.

Generally, baseband correction of the I/Q mismatch of the receiver is performed based on a 2×2 distortion matrix defining a relationship between the actual I and Q components having been distorted by the I/Q mismatch of receiver and the ideal I and Q components. However, the distortion matrix is not easily measured (i.e calibrated).

Thus, there remains a need for a system and method for providing baseband correction of an I/Q mismatch of a direct conversion radio frequency receiver and more particularly for calibrating the distortion matrix used to compensate for the I/Q mismatch of the receiver.

SUMMARY OF THE INVENTION

The present invention provides a system and method for calibrating for an I/Q mismatch of a direct conversion receiver based on a random signal having a two-dimensional I versus Q trajectory, such as radio frequency (RF) noise. In general, the random signal is received and downconverted to a quadrature baseband signal having an in-phase component and a quadrature component. The variance of the in-phase component, the variance of the quadrature component, and the covariance of the in-phase component with the quadrature component are computed based on samples of the quadrature baseband signal. A correction matrix used to compensate for the I/Q mismatch of the receiver and/or I/Q mismatch including a gain mismatch and a phase mismatch of the receiver is then computed based on the variance of the in-phase component, the variance of the quadrature component, and the covariance of the in-phase component with the quadrature component.

In one embodiment, the variance of the in-phase component, the variance of the quadrature component, and the covariance of the in-phase component with the quadrature component are computed for both a high gain setting and a low gain setting. Differences of the variance of the in-phase component, the variance of the quadrature component, and the covariance of the in-phase component with the quadrature component for the high and low gain settings are then computed. Based on the differences, the correction matrix and/or the gain and phase mismatch errors are computed.

In another embodiment, the variance of the in-phase component, the variance of the quadrature component, and the covariance of the in-phase component with the quadrature component are determined for numerous DC offset levels, or operating points, of analog-to-digital converters that convert the baseband quadrature signal into a digital signal. Thereafter, the variances of the in-phase component are averaged to provide an average variance of the in-phase component; the variances of the quadrature component are averaged to provide an average variance of the quadrature component; and the covariances of the in-phase component with the quadrature component are averaged to provide an average covariance of the in-phase component with the quadrature component. Based on the averaged values, the correction matrix and/or the gain and phase mismatch errors are computed.

Thereafter, the correction matrix and/or the gain and phase mismatch errors may be updated by computing the variance of the in-phase component, the variance of the quadrature component, and the covariance of the in-phase component with the quadrature component for one of the DC offset levels. These values and the values of the variance of the in-phase component, the variance of the quadrature component, and the covariance of the in-phase component and the quadrature component determined previously are filtered to provide filtered values. Based on the filtered values, an updated correction matrix and/or gain and phase mismatch errors are computed.

In another embodiment, the variance of the in-phase component, the variance of the quadrature component, and the covariance of the in-phase component with the quadrature component are determined for numerous DC offset levels, or operating points, of analog-to-digital converters that convert the baseband quadrature signal into a digital signal for both a high gain setting and a low gain setting. For each of the DC offset levels, differences of the variance of the in-phase component, the variance of the quadrature component, and the covariance of the in-phase component and the quadrature component for the high and low gain settings are then computed. The variances of the in-phase component for each of the DC offset levels are averaged to provide an average variance of the in-phase component, the variances of the quadrature component for each of the DC offset levels are averaged to provide an average variance of the quadrature component, and the covariances of the in-phase component with the quadrature component for each of the DC offset levels are averaged to provide an average covariance of the in-phase component and the quadrature component. Based on the averaged values, the correction matrix and/or the gain and phase mismatch errors are computed.

Thereafter, the correction matrix and/or the gain and phase mismatch errors may be updated by computing the variance of the in-phase component, the variance of the quadrature component, and the covariance of the in-phase component with the quadrature component for one of the DC offset levels for each of the high and low gain settings. Differences of the variance of the in-phase component, the variance of the quadrature component, and the covariance of the in-phase component with the quadrature component for the high and low gain settings are then computed. These differences and the differences of the variance of the in-phase component, the variance of the quadrature component, and the covariance of the in-phase component with the quadrature component determined previously are filtered to provide filtered values. Based on the filtered values, an updated correction matrix and/or gain and phase mismatch errors are computed.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 4:
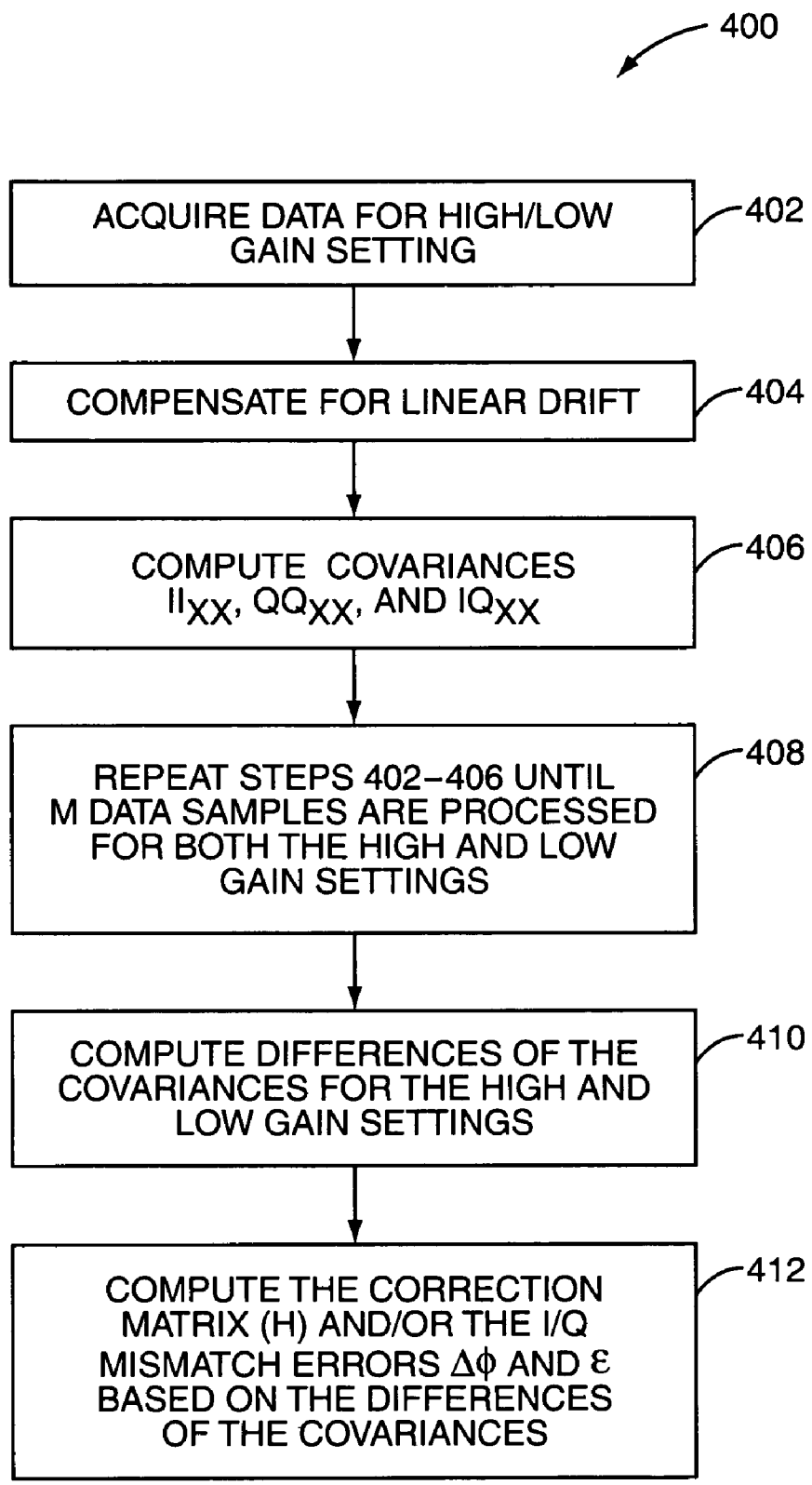
Figure 5:
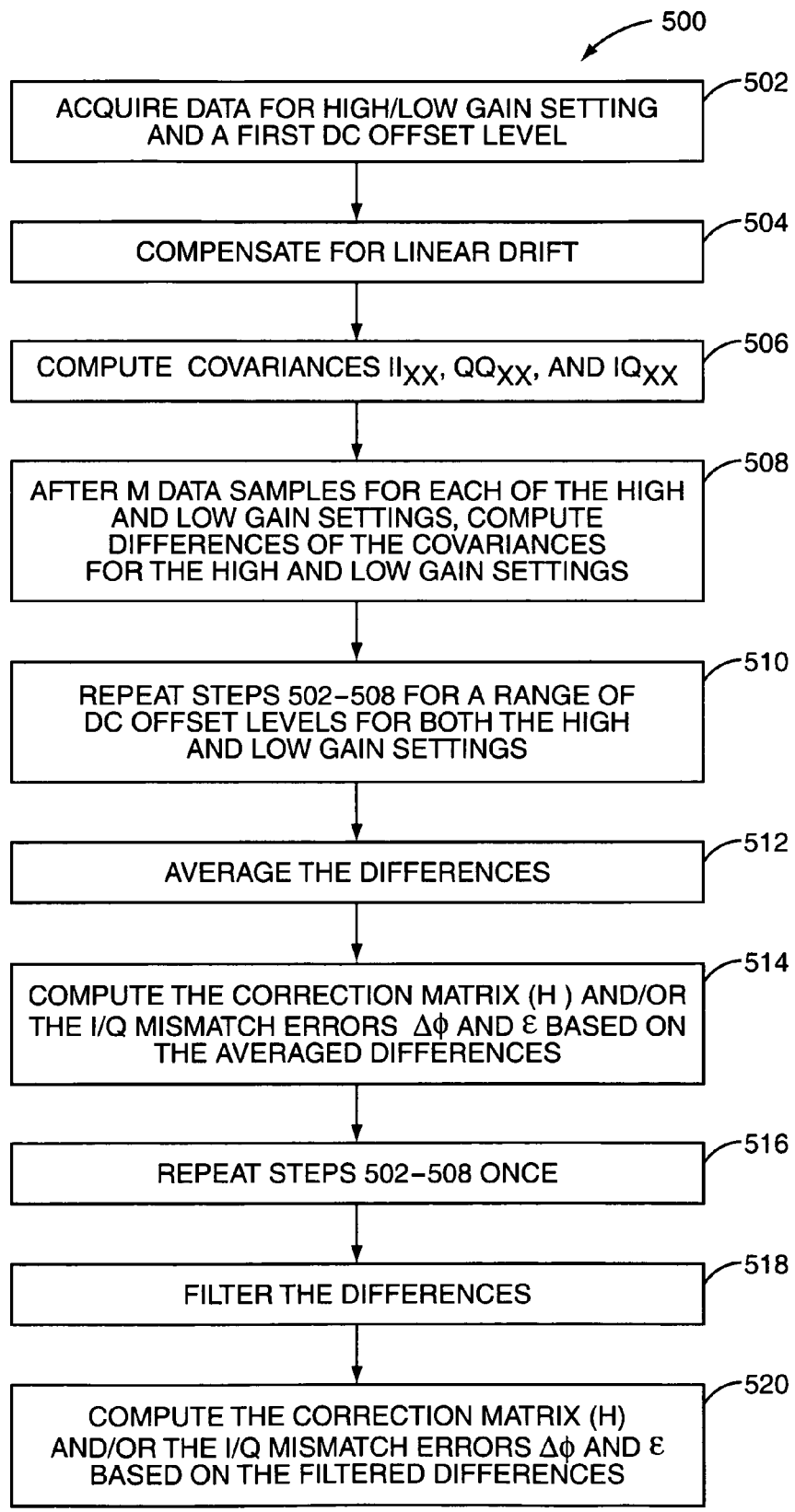

FIG. 4 illustrates a method for computing a correction matrix (H) used for baseband correction of the I/Q mismatch of a direct conversion receiver and/or a gain and phase mismatch error based on radio frequency noise according to one embodiment of the present invention; and FIG. 5 illustrates a method for computing a correction matrix (H) used for baseband correction of the I/Q mismatch of a direct conversion receiver and/or a gain and phase mismatch error based on radio frequency noise according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
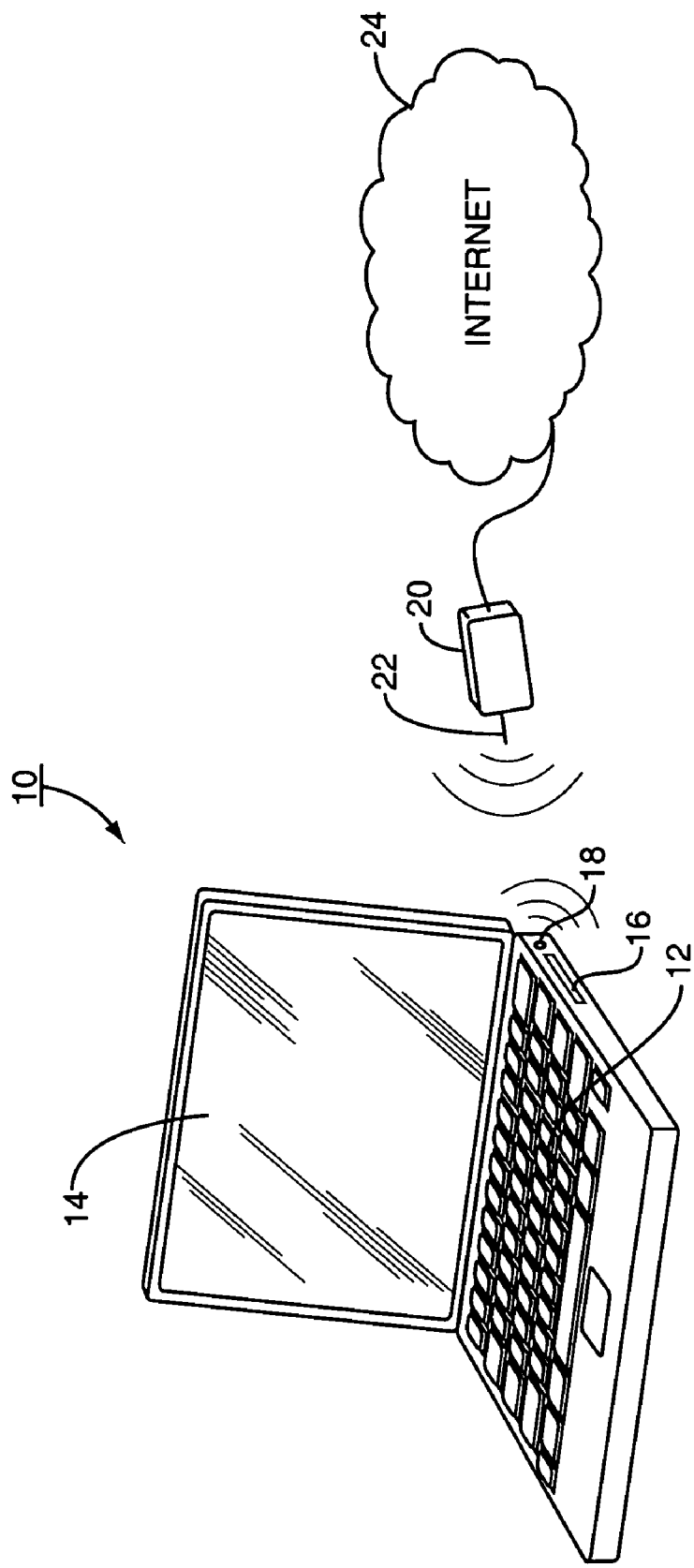
FIG. 1 illustrates a conventional laptop computer connected to the Internet via a connection according to the IEEE 802.11 standard.

The present invention is preferably incorporated in a mobile terminal, such as a laptop computer, personal digital assistant, wireless Local Area Network (LAN) device, or the like. Mobile terminals such as laptop computer 10 in FIG. 1 are becoming more prevalent with each passing day. The laptop computer 10 may have a keyboard 12, a display 14, a disk drive 16, and other input/output devices as is well understood. The laptop computer 10 includes an antenna 18 for communicating wirelessly to a modem 20 using such standards as IEEE 802.11. The modem 20 may be a cable modem or the like and may incorporate a hub (not shown) with an antenna 22 that receives the wireless signals from the laptop computer 10. The modem 20 connects to the Internet 24 as is well understood. By providing the laptop computer 10 with a wireless modem and antenna 18, the designers allow users of the laptop computer 10 to improve the mobility and versatility of the laptop computer 10.

Figure 2:
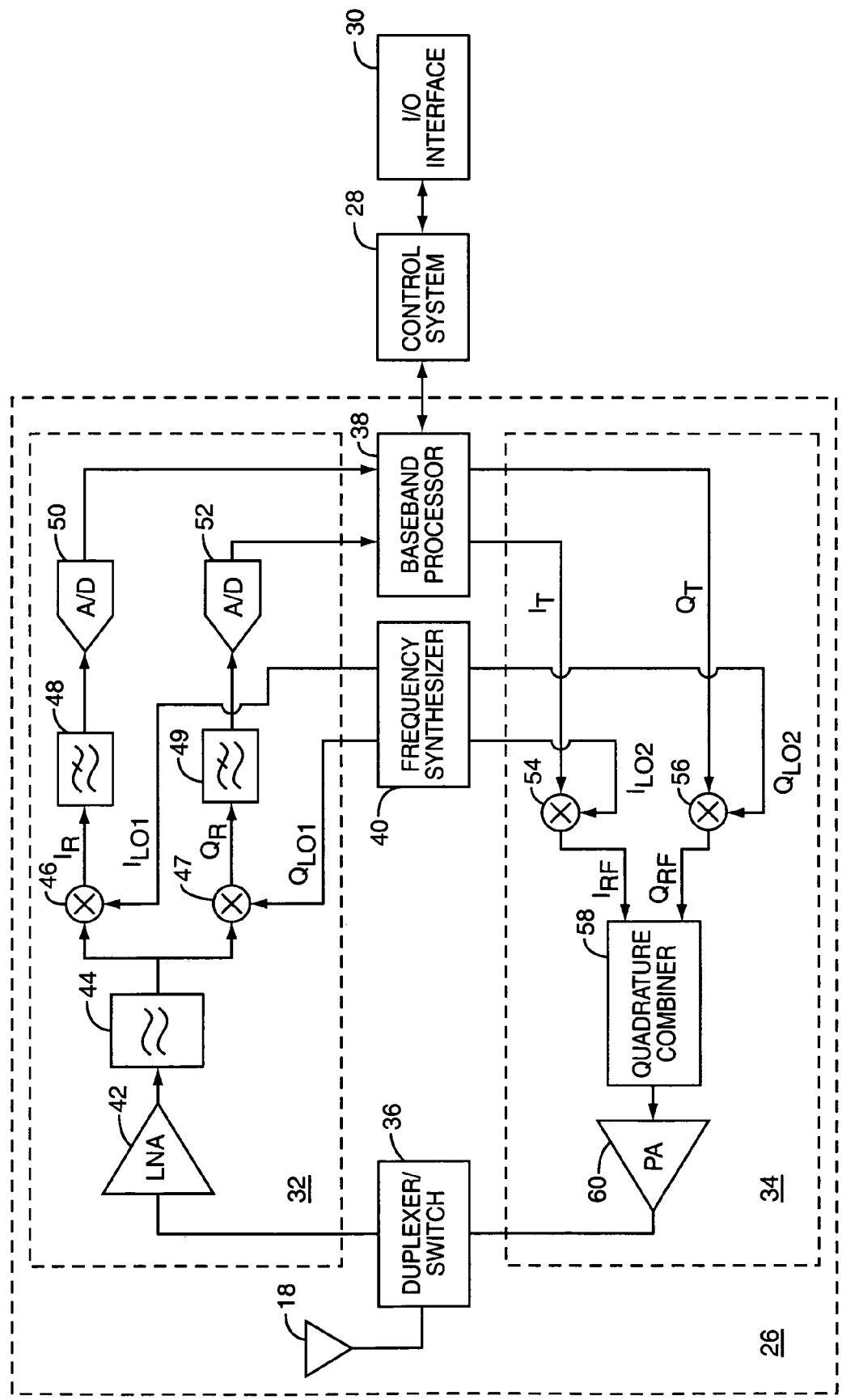
FIG. 2 illustrates a schematic diagram of a wireless modem according to one embodiment of the present invention.

FIG. 2 illustrates an exemplary wireless modem 26 including antenna 18 for use in the laptop computer 10 of FIG. 1. This embodiment is exemplary, and the wireless modem 26 may be incorporated into any device to provide wireless communication according to IEEE 802.11. In addition to the wireless modem 26, the laptop computer 10 includes a control system 28, which may be a microprocessor and associated operating system and the like as is well understood. The control system 28 is associated with an I/O interface 30 to receive inputs from a user and generate outputs for the user. For example, the I/O interface 30 may cooperate with the keyboard 12 and the display 14 as is well understood.

The wireless modem 26 includes a receiver front end 32, a radio frequency transmitter 34, the antenna 18, a duplexer or switch 36, a baseband processor 38, and a frequency synthesizer 40. The receiver front end 32 receives information bearing radio frequency signals from one or more remote transmitters such as another wireless modem. A low noise amplifier (LNA) 42 amplifies the received signal, and a filter circuit 44 minimizes broadband interference in the received signal. Mixers 46 and 47 receive the received signal from the filter circuit 44 and operate to downconvert the radio frequency signal from a radio frequency to baseband, thereby providing a quadrature receive signal ($I_R$, $Q_R$) at baseband. Low-pass filters 48 and 49 filter the quadrature receive signal ($I_R$, $Q_R$) to remove high frequency components prior to digitization by analog-to-digital (A/D) converters 50 and 52.

More specifically, the mixer 46 mixes the radio frequency signal from the filter circuit 44 with an in-phase component ($I_{LO1}$) of a local oscillator frequency signal ($I_{LO1}$, $Q_{LO1}$) provided by the frequency synthesizer 40 to provide the in-phase component ($I_R$) of the quadrature receive signal ($I_R$, $Q_R$). The mixer 46 mixes the radio frequency signal from the filter circuit 44 with a quadrature component ($Q_{LO1}$) of the local oscillator frequency signal ($I_{LO1}$, $Q_{LO1}$) to provide the quadrature component ($Q_R$) of the quadrature receive signal ($I_R$, $Q_R$). The frequency of the local oscillator frequency signal ($I_{LO1}$, $Q_{LO1}$) is essentially equal to a center frequency of the received radio frequency signal such that the mixers 46 and 47 provide the quadrature receive signal ($I_R$, $Q_R$) at baseband. The quadrature receive signal ($I_R$, $Q_R$) is filtered by low-pas filters 48 and 49 and digitized by the AND converters 50 and 52. The digitized quadrature receive signal ($I_R$, $Q_R$) is provided to the baseband processor 38.

The baseband processor 38 processes the digitized quadrature baseband signal ($I_R$, $Q_R$) to extract the information or data bits conveyed in the received signal. This processing typically comprises demodulation, decoding, and error correction operations. As such, the baseband processor 38 is generally implemented in one or more digital signal processors (DSPs).

On the transmit side, the baseband processor 38 receives digitized data from the control system 28, which it encodes for transmission. After encoding the data from the control system 28, the baseband processor 38 modulates the encoded data according to a predetermined modulation scheme. In one embodiment, the modulation scheme is Orthogonal Frequency Division Multiplexing (OFDM), as defined in IEEE 802.11a/g. The baseband processor 38 then provides the modulated signal, hereafter referred to as a transmit signal, to the radio frequency transmitter 34. Within the radio frequency transmitter 34, mixers 54 and 56 operate to upconvert the transmit signal ($I_T$, $Q_T$) from the baseband processor 38 to a carrier frequency. More specifically, the mixer 54 mixes an in-phase component ($I_T$) of the transmit signal ($I_T$, $Q_T$) with an in-phase component ($I_{LO2}$) of a local oscillator frequency signal ($I_{LO2}$, $Q_{LO2}$) to provide an in-phase component ($I_{RF}$) of a radio frequency transmit signal ($I_{RF}$, $Q_{RF}$). The mixer 56 mixes a quadrature component ($Q_T$) of the transmit signal ($I_T$, $Q_T$) with a quadrature component ($Q_{LO2}$) of the local oscillator frequency signal ($I_{LO2}$, $Q_{LO2}$) to provide a quadrature component ($Q_{RF}$) of the radio frequency transmit signal ($I_{RF}$, $Q_{RF}$).

The in-phase component ($I_{RF}$) and the quadrature component ($Q_{RF}$) of the radio frequency transmit signal ($I_{RF}$, $Q_{RF}$) are combined by a quadrature combiner 58 to provide a combined transmit signal. The combined transmit signal is amplified by power amplifier circuitry 60 to a level appropriate for transmission from the antenna 18. A gain of the power amplifier circuitry 60 may be controlled by the control system 28 via the baseband processor 38 or solely by the baseband processor 38.

Although the mixers 46 and 47 of the receiver front end 32 are typically designed to have the same characteristics, the gain of the mixer 46 may not be equal to the gain of the mixer 47, thereby resulting in a gain error. In addition, the in-phase component ($I_{LO1}$) and the quadrature component ($Q_{LO1}$) of the local oscillator frequency signal ($I_{LO1}$, $Q_{LO1}$) are ideally 90 degrees out-of-phase. However, there is typically a phase error, also called quadrature error, due to inherent errors of the frequency synthesizer 40 and differences in layout paths. Combined, the gain error and the quadrature error form an I/Q mismatch of the receiver front end 32.

The present invention provides a method of correcting the I/Q mismatch of the receiver front end 32 based on radio frequency (RF) noise or some other random signal having a two-dimension I versus Q trajectory. More specifically, the present invention provides a method of determining the I/Q mismatch of the receiver front end 32 and/or calibrating a correction matrix used to post-distort the digitized quadrature receive signal ($I_R$, $Q_R$) within the baseband processor 38 in order to compensate for the I/Q mismatch of the receiver front end 32.

The operation of the receiver chain up to and including the ADCs may be generally defined by the following equation:

$$\begin{pmatrix} I_R \\ Q_R \end{pmatrix} = K \begin{pmatrix} I_{IN} \\ Q_{IN} \end{pmatrix}, \text{ where } K = \begin{pmatrix} K_{11} & K_{12} \\ K_{21} & K_{22} \end{pmatrix}.$$

When compensating for the I/Q mismatch of the receiver front end, the received radio frequency signal may be defined as:

$$PF(t) = I_{IN} \cos(\omega \cdot t) - Q_{IN} \sin(\omega \cdot t), \text{ and}$$

$I_R$ and $Q_R$ are equivalent to the in-phase component ($I_R$) and the quadrature component ($Q_R$) of the quadrature receive signal ($I_R$, $Q_R$). As such, the operation of the baseband processor may be defined as:

$$\begin{pmatrix} I_R \\ Q_R \end{pmatrix} = K_{RX} \begin{pmatrix} I_{IN} \\ Q_{IN} \end{pmatrix},$$

where $K_{RX}$ is a distortion matrix defining a distortion of the receiver front end 32. Thus, in one embodiment, the baseband processor 38 may compensate for the I/Q mismatch of the receiver front end 32 using a correction matrix (H) defined as the inverse of the distortion matrix $K_{RX}$. In another embodiment, the baseband processor 38 computes the I/Q mismatch, namely the phase error $\Delta\phi$ and the gain error $\epsilon$, which may be used to compensate for the I/Q mismatch in either the receiver front end 32 or in the baseband processor 38. The gain and phase error measurements may also be used by designers to determined if a predetermined design targets for the gain and phase error have been achieved.

Figure 3:
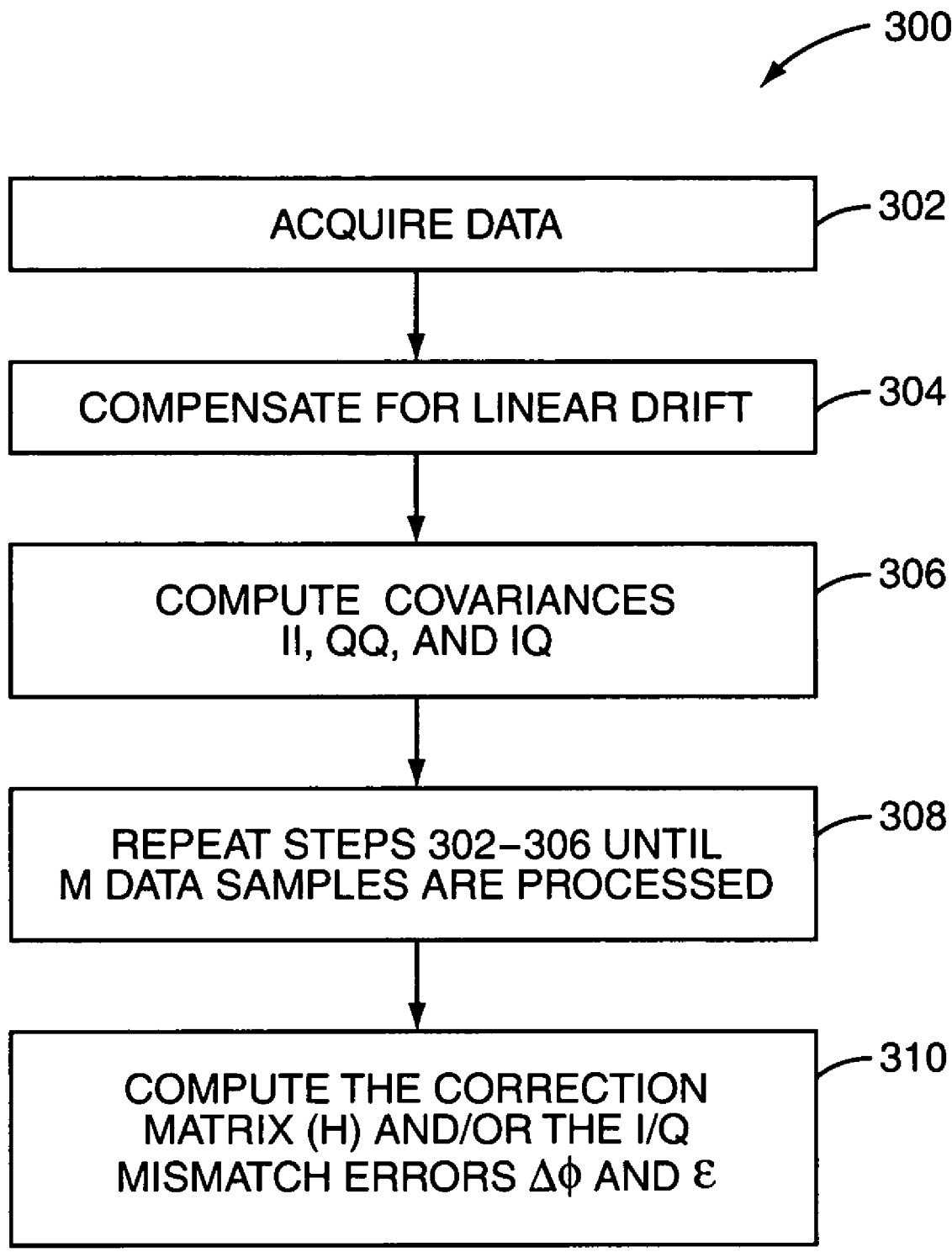
FIG. 3 illustrates a method for computing a correction matrix (H) used for baseband correction of the I/Q mismatch of a direct conversion receiver and/or a gain and phase mismatch error based on radio frequency noise according to one embodiment of the present invention.

FIG. 3 illustrates a method 300 for determining the correction matrix (H) and/or the I/Q mismatch based on RF noise according to one embodiment of the present invention. Data samples, or samples of the digitized quadrature receive signal ($I_R$, $Q_R$), are first acquired (step 302). These samples are acquired when only RF noise is present at the antenna 18. As discussed below in more detail, if a packet is received during the data acquisition step 302, the data samples are deemed to be corrupted for I/Q calibration purposes and are discarded. As an alternative to using RF noise, any random signal having a two-dimensional I versus Q trajectory may be used. The data samples may be acquired from data buffers storing N samples of the in-phase component ($I_R$) and the quadrature component ($Q_R$) such that the baseband processor 38 obtains a block of data samples from the data buffers. Alternatively, data samples may continuously be provided without first being stored in buffers.

After the data samples are acquired, the data samples are compensated for drift (step 304). In other words, the data samples are detrended. As used herein, drift is defined as low frequency components of noise that appear monotonic over the acquisition interval. In one embodiment where the data samples are retrieved from a data buffer, a line is fitted through the data samples for $I_R$ and then subtracted from the data samples for $I_R$. Similarly, a line is fitted through the data samples for $Q_R$ and then subtracted from the data samples for $Q_R$. In another embodiment where the data samples are continuously processed by the baseband processor 38 rather than obtained in blocks from the data buffers, the data samples may be high pass filtered by, for example, an Infinite Impulse Response (IIR) high pass filter in order to compensate for drift. Hereafter, the steps assume that the data samples are acquired from data buffers. However, the present invention is not limited thereto.

Next, covariances (II, QQ, and IQ) are computed recursively based on the following equations:

$$II = II + \sum_{n=1}^{N} I_{R,n}^2,$$

$$QQ = QQ + \sum_{n=1}^{N} Q_{R,n}^2, \text{ and}$$

$$IQ = IQ + \sum_{n=1}^{N} I_{R,n} \cdot Q_{R,n}, \text{ where}$$

II is the variance of $I_R$, QQ is the variance of $Q_R$, IQ is the covariance of $I_R$ with $Q_R$, and N is the number of data samples in the data buffers (step 306). Thus, II, QQ, and IQ are the un-normalized variances and covariance over several buffers worth of data. Each buffer contains N-samples. The variance of $I_R$, the variance of $Q_R$, and the covariance of $I_R$ with $Q_R$ are generally referred to as covariances II, QQ, and IQ. These equations assume that the data samples are acquired from data buffers storing N samples $I_R$ and $Q_R$. Initially, II, QQ, and IQ are initialized to zero.

After computing the covariances in step 306, steps 302 through 306 are repeated until M data samples are acquired and processed (step 308). The number of data samples M depends on the particular implementation and may be selected based on a tradeoff between the accuracy of the covariances II, QQ, and IQ and speed, where speed is the amount of time required to acquire and process the M data samples according to steps 302-308. In one embodiment, M is approximately 200,000.

Finally, the correction matrix (H) and/or the I/Q mismatch errors ($\Delta\phi$ and $\Delta$) are computed based on the covariances II, QQ, and IQ (step 310). As described below in detail, the correction matrix (H) and/or the I/Q mismatch errors ($\Delta\phi$ and $\epsilon$) may be computed based on the following equations:

$$H = \begin{pmatrix} \sqrt{QQ} & \frac{-IQ}{\sqrt{QQ}} \\ 0 & \sqrt{II - \frac{IQ^2}{QQ}} \end{pmatrix}, \quad (1)$$

$$\varepsilon = 2 \cdot \frac{\sqrt{II} - \sqrt{QQ}}{\sqrt{II} + \sqrt{QQ}}, \quad \text{and} \quad (2)$$

$$\Delta\varphi = \text{Arcsin}\left(\frac{IQ}{\sqrt{II \cdot QQ}}\right). \quad (3)$$

The mathematical details of the derivation of equations will now be described. A symmetric model of the I/Q mismatch of the receiver front end 32 may be defined as:

$$\begin{pmatrix} I_o \\ Q_o \end{pmatrix} = \begin{pmatrix} K_{11} & K_{12} \\ K_{21} & K_{22} \end{pmatrix} \cdot \begin{pmatrix} I_i \\ Q_i \end{pmatrix},$$

$$\begin{pmatrix} K_{11} & K_{12} \\ K_{21} & K_{22} \end{pmatrix} = A \cdot \begin{pmatrix} \left(1 + \frac{\varepsilon}{2}\right)\cos\left(\frac{\Delta\varphi}{2}\right) & \left(1 + \frac{\varepsilon}{2}\right)\sin\left(\frac{\Delta\varphi}{2}\right) \\ \left(1 - \frac{\varepsilon}{2}\right)\sin\left(\frac{\Delta\varphi}{2}\right) & \left(1 - \frac{\varepsilon}{2}\right)\cos\left(\frac{\Delta\varphi}{2}\right) \end{pmatrix}, \quad \text{and}$$

and the RF noise at the antenna is defined as:

$$RF\text{noise} = I_i \cos(\omega_{RF}t) - Q_i \sin(\omega_{RF}t).$$

$K_{11}$ through $K_{22}$ define a distortion matrix $K_{RX}$ of the receiver front end 32, $I_o$ and $Q_o$ define the baseband noise at the output of the receiver front end 32, and A is the average IQ gain. This model is called "symmetric" because it splits the imbalances evenly between the two mixers 46 and 47. There is no loss of generality in using a symmetric model.

Now, let $<x,y>$ denote the correlation of x and y, which is the dot product of the vectors x and y divided by the number of entries. Assuming that $<I_i, Q_i>=0$ and that $A^2 <I_i, I_i> = A^2 <Q_i, Q_i> = C^2$, $$II = <I_o, I_o>$$

$$QQ = <Q_o, Q_o>, \text{ and}$$

$$IQ = <I_o, Q_o>.$$

Then, $$II = (K_{11}^2 + K_{12}^2) \cdot C^2,$$

$$QQ = (K_{21}^2 + K_{22}^2) \cdot C^2, \text{ and}$$

$$IQ = (K_{11}K_{21} + K_{12}K_{22}) \cdot C^2.$$

Substituting for $K_{11}$ through $K_{22}$, $$II = \left(1 + \frac{\varepsilon}{2}\right)^2 \cdot C^2,$$

$$QQ = \left(1 - \frac{\varepsilon}{2}\right)^2 \cdot C^2, \text{ and}$$

$$IQ = \left(1 - \frac{\varepsilon^2}{4}\right) \cdot C^2 \cdot \sin(\Delta\varphi).$$

Solving for C, $\epsilon$, and $\Delta\phi$ yields, $$C = \left(\frac{\sqrt{II} + \sqrt{QQ}}{2}\right),$$

$$\varepsilon = 2 \cdot \frac{\sqrt{II} - \sqrt{QQ}}{\sqrt{II} + \sqrt{QQ}}, \text{ and}$$

$$\Delta\varphi = \text{Arcsin}\left(\frac{IQ}{\sqrt{II \cdot QQ}}\right).$$

Now turning to the extraction of the correction matrix (H). The IQ covariance matrix of the incoming RF noise is proportional to the 2×2 identity matrix. I/Q mismatch makes the covariance matrix at the output of the receiver front end 32 non-diagonal with unequal diagonal elements. The correction matrix (H) is a change of variables such that the covariance matrix of the new variables is proportional to the identity matrix. Let P be the covariance matrix of the vector $x=[I_o, Q_o]$, and E be the expectation operator. Thus, by definition, $$P = E[xx^T].$$

A new set of variables, y, may then be related to x through a non-singular transformation matrix H. Note that H is also the correction matrix (H) The vector of new variables is:

$$y = Hx.$$

Let the covariance of y be M. Thus, by definition, $$M = E[yy^T].$$

Substituting for y provides:

$$M = E[Hxx^T H^T], \text{ or}$$

$$M = HPH^T.$$

The objective is to make M proportional to the identity matrix. Since the correction matrix is normalized later, there is no loss of generality in making M equal the identity matrix. Setting M equal to the identity matrix and solving for P provides:

$$P = H^{-1}H^{-T}, \text{ or}$$

$$P^{-1} = H^T H.$$

This implies that the Cholesky decomposition of P inverse gives the desired transformation matrix H. More specifically, if $$P^{-1} = (\text{CONSTANT}) \cdot \begin{pmatrix} QQ & -IQ \\ -IQ & II \end{pmatrix}, \text{ and}$$

-continued $$H = \begin{pmatrix} a & b \\ 0 & c \end{pmatrix}, \text{ then}$$

$$\begin{pmatrix} QQ & -IQ \\ -IQ & II \end{pmatrix} = \begin{pmatrix} a & 0 \\ b & c \end{pmatrix} \cdot \begin{pmatrix} a & b \\ 0 & c \end{pmatrix}.$$

The constant, CONSTANT, may be ignored since the correction matrix can be normalized to the largest element. Accordingly, $$a = \sqrt{QQ},$$

$$b = \frac{-IQ}{\sqrt{QQ}}, \text{ and}$$

$$c = \sqrt{II - \frac{IQ^2}{QQ}}.$$

Therefore, the correction matrix (H) is:

$$H = \begin{pmatrix} \sqrt{QQ} & \frac{-IQ}{\sqrt{QQ}} \\ 0 & \sqrt{II - \frac{IQ^2}{QQ}} \end{pmatrix}.$$

FIG. 4 illustrates a method 400 for determining the correction matrix (H) and/or the I/Q mismatch based on RF noise according to another exemplary embodiment of the present invention. This embodiment compensates for excessive baseband noise. Uncompensated, excessive baseband noise can corrupt the calibration. Data samples, or samples of the digitized quadrature receive signal ($I_R$, $Q_R$), are first acquired for either a high or low gain setting of the LNA 42 (step 402). These samples are acquired when only RF noise is present at the antenna 18. As discussed below in more detail, if a packet is received during the data acquisition step 402, the data samples are deemed to be corrupted for I/Q calibration purposes and are discarded. As an alternative to using RF noise, any random signal having a two-dimensional I versus Q trajectory may be used. The data samples may be acquired from data buffers storing N samples of the in-phase component ($I_R$) and the quadrature component ($Q_R$) such that the baseband processor 38 obtains a block of data samples from the data buffers. Alternatively, data samples may continuously be provided without first being stored in buffers.

After the data samples are acquired, the data samples are compensated for drift (step 404). In other words, the data samples are detrended. In one embodiment where the data samples are retrieved from a data buffer, a line is fitted through the data samples for $I_R$ and then subtracted from the data samples for $I_R$. Similarly, a line is fitted through the data samples for $Q_R$ and then subtracted from the data samples for $Q_R$. In another embodiment where the data samples are continuously processed by the baseband processor 38 rather than obtained in blocks from the data buffers, the data samples may be high pass filtered by, for example, an Infinite Impulse Response (IIR) high pass filter in order to compensate for linear drift. Hereafter, the steps assume that the data samples are acquired from data buffers. However, the present invention is not limited thereto.

Next, covariances ($II_{XX}$, $QQ_{XX}$, and $IQ_{XX}$) are computed based on the following equations:

$$II_{XX} = II_{XX} + \sum_{n=1}^{N} I_{R,n}^2,$$

$$QQ_{XX} = QQ_{XX} + \sum_{n=1}^{N} Q_{R,n}^2, \text{ and}$$

$$IQ_{XX} = IQ_{XX} + \sum_{n=1}^{N} I_{R,n} \cdot Q_{R,n}, \text{ where}$$

$II_{XX}$ is the variance of $I_R$; $QQ_{XX}$ is the variance of $Q_R$; $IQ_{XX}$ is the covariance of $I_R$ and $Q_R$; and N is the number of data samples in the data buffers (step 406). The subscript XX is either HH indicating the high gain setting of the LNA 42 or LL indicating the low gain setting of the LNA 42. These equations assume that the data samples are acquired from data buffers storing N samples $I_R$ and $Q_R$. Initially, II, QQ, and IQ are initialized to zero.

After computing the covariances in step 406, steps 402 through 406 are repeated until M data samples are acquired and processed for each of the high and low gain settings of the LNA 42 (step 408). The number of data samples M depends on the particular implementation and may be selected based on a tradeoff between the accuracy of the covariances $II_{XX}$, $QQ_{XX}$, and $IQ_{XX}$ and speed.

Next, differences of the covariances for the high and low gain settings are computed (step 410). The differences may be computed according to the following equations:

$$II_{DIF} = II_{HH} - II_{LL},$$

$$QQ_{DIF} = QQ_{HH} - QQ_{LL}, \text{ and}$$

$$IQ_{DIF} = IQ_{HH} - IQ_{LL}.$$

Finally, the correction matrix (H) and/or the I/Q mismatch errors ($\Delta\phi$ and $\epsilon$) are computed based on the differences of the covariances $II_{DIF}$, $QQ_{DIF}$, and $IQ_{DIF}$ (step 412). As described below in detail, the correction matrix (H) and/or the I/Q mismatch errors ($\Delta\phi$ and $\epsilon$) may be computed based on the following equations:

$$H = \begin{pmatrix} \sqrt{QQ_{DIF}} & \frac{-IQ_{DIF}}{\sqrt{QQ_{DIF}}} \\ 0 & \sqrt{II_{DIF} - \frac{IQ_{DIF}^2}{QQ_{DIF}}} \end{pmatrix}.$$

$$\varepsilon = 2 \cdot \frac{\sqrt{II_{DIF}} - \sqrt{QQ_{DIF}}}{\sqrt{II_{DIF}} + \sqrt{QQ_{DIF}}}, \text{ and}$$

$$\Delta\varphi = \text{Arcsin}\left(\frac{IQ_{DIF}}{\sqrt{II_{DIF} \cdot QQ_{DIF}}}\right).$$

By computing the correction matrix (H) and/or the I/Q mismatch error based on the differences of the covariances obtained while the LNA 42 is set to the high gain setting and the covariances obtained while the LNA 42 is set to the low gain setting, baseband noise is removed such that the differences ($II_{DIF}$, $QQ_{DIF}$, and $IQ_{DIF}$) contain essentially no component due to baseband noise.

FIG. 5 illustrates a method 500 according to another exemplary embodiment of the present invention. This embodiment is similar to that described in FIG. 4. However, the method 500 also operates to compensate for imperfections in the A/D converters 50 and 52. In particular, if a histogram were generated based on the output of either one of the A/D converters 50 and 52 while RF noise is being received, the histogram would ideally be a Gaussian curve. However, due to imperfections of the A/D converters 50 and 52, the histogram may include spikes and/or notches that deviate from the ideal Gaussian curve. The method 500 operates to smooth out these deviations, or in other words compensate for imperfections of the A/D converters 50 and 52 by periodically varying the operating point, or DC offset level, of the A/D converters 50 and 52 during data acquisition, and averaging or filtering the differences of the covariances. By varying the operating point of the A/D converters 50 and 52, the deviations in the histogram can be reduced by averaging. For example, suppose that 300 data samples of $I_R$ and $Q_R$ are stored in data buffers. The covariances for both the high and low gain settings may be computed for 60 sets of data samples from the data buffers for each of fifteen operating points of the A/D converters 50 and 52. Thereafter, the differences of the covariances for the high and low gain settings may be computed for each of the fifteen operating points of the A/D converters 50 and 52. By averaging the differences of the covariances, average differences of the covariances are obtained, where errors due to imperfections of the A/D converters 50 and 52 are substantially reduced if not eliminated.

More specifically, the method 500 first acquires data samples, or samples of the digitized quadrature receive signal ($I_R$, $Q_R$), for either high or low gain setting of the LNA 42 while a first DC offset level is provided to the A/D converters 50 and 52 (step 502). These samples are acquired when only RF noise is present at the antenna 18. As discussed below in more detail, if a packet is received during the data acquisition step 502, the data samples are deemed to be corrupted for I/Q calibration purposes and are discarded. As an alternative to using RF noise, any random signal having a two-dimensional I versus Q trajectory may be used. The data samples may be acquired from data buffers storing N samples of the in-phase component ($I_R$) and the quadrature component ($Q_R$) such that the baseband processor 38 obtains a block of data samples from the data buffers. Alternatively, data samples may continuously be provided without first being stored in buffers.

After the data samples are acquired, the data samples are compensated for drift (step 504). In other words, the data samples are detrended. In one embodiment where the data samples are retrieved from a data buffer, a line is fitted through the data samples for $I_R$ and then subtracted from the data samples for $I_R$. Similarly, a line is fitted through the data samples for $Q_R$ and then subtracted from the data samples for $Q_R$. In another embodiment where the data samples are continuously processed by the baseband processor 38 rather than obtained in blocks from the data buffers, the data samples may be high pass filtered by, for example, an Infinite Impulse Response (IIR) high pass filter in order to compensate for drift. Hereafter, the steps assume that the data samples are acquired from data buffers. However, the present invention is not limited thereto.

Next, covariances ($II_{XX}$, $QQ_{XX}$, and $IQ_{XX}$) are computed based on the following equations:

$$II_{XX} = II_{XX} + \sum_{n=1}^{N} I_{R,n}^2,$$

$$QQ_{XX} = QQ_{XX} + \sum_{n=1}^{N} Q_{R,n}^2, \text{ and}$$

$$IQ_{XX} = IQ_{XX} + \sum_{n=1}^{N} I_{R,n} \cdot Q_{R,n}, \text{ where}$$

$II_{XX}$ is the variance of $I_R$; $QQ_{XX}$ is the variance of $Q_R$; $IQ_{XX}$ is the covariance of $I_R$ and $Q_R$; and N is the number of data samples in the data buffers (step 506). The subscript XX is either HH indicating the high gain setting of the LNA 42 or LL indicating the low gain setting of the LNA 42. These equations assume that the data samples are acquired from data buffers storing N samples $I_R$ and $Q_R$. Initially, II, QQ, and IQ are initialized to zero.

After M data samples for each of the high and low gain settings are processed, differences of the covariances for the high and low gain settings are computed (step 508). In one embodiment, N (number of data samples stored in the data buffers) is 300, and M is 1800 (N×60). The differences may be computed according to the following equations:

$$II_{DIF} = II_{HH} - II_{LL},$$

$$QQ_{DIF} = QQ_{HH} - QQ_{LL}, \text{ and}$$

$$IQ_{DIF} = IQ_{HH} - IQ_{LL}.$$

Next, steps 502 through 508 are repeated for a range of DC offset levels for the A/D converters 50 and 52 for both the high and low gain settings (step 510). In one embodiment, steps 502 through 508 are performed for a total of sixteen DC offset levels including the first DC offset level of step 502 for each of the high and low gain settings. As a result, sixteen values of the differences II, QQ, and IQ are computed. Thereafter, the values of the differences II, QQ, and IQ determined in steps 502 through 510 are averaged to provide average differences $II_{AVG}$, $QQ_{AVG}$, and $IQ_{AVG}$ (step 512).

Using the average differences $II_{AVG}$, $QQ_{AVG}$, and $IQ_{AVG}$, the correction matrix (H) and/or the I/Q mismatch errors ($\Delta\phi$ and $\epsilon$) are computed (step 514). As described below in detail, the correction matrix (H) and/or the I/Q mismatch errors ($\Delta\phi$ and $\epsilon$) may be computed based on the following equations:

$$H = \begin{pmatrix} \sqrt{QQ_{AVG}} & \dfrac{-IQ_{AVG}}{\sqrt{QQ_{AVG}}} \\ 0 & \sqrt{II_{AVG} - \dfrac{IQ_{AVG}^2}{QQ_{AVG}}} \end{pmatrix},$$

$$\varepsilon = 2 \cdot \dfrac{\sqrt{II_{AVG}} - \sqrt{QQ_{AVG}}}{\sqrt{II_{AVG}} + \sqrt{QQ_{AVG}}}, \text{ and}$$

$$\Delta\varphi = \operatorname{Arcsin}\left( \dfrac{IQ_{AVG}}{\sqrt{II_{AVG} \cdot QQ_{AVG}}} \right).$$

By computing the correction matrix (H) and/or the I/Q mismatch error based on the average differences of the covariances obtained while the LNA 42 is set to the high gain setting and the covariances obtained while the LNA 42 is set to the low gain setting, baseband noise is removed such that the average differences ($II_{AVG}$, $QQ_{AVG}$, and $IQ_{AVG}$) contain essentially no component due to baseband noise, and errors associated with imperfections of the A/D converters 50 and 52 are substantially reduced if not eliminated.

At some time after step 514 is performed, it may be desirable to update the correction matrix (H) and/or the I/Q mismatch error. The method 500 may then switch from an averaging scheme to a filtering scheme. If the method were to continue the averaging scheme, the average differences $II_{AVG}$, $QQ_{AVG}$, and $IQ_{AVG}$ would develop inertia and would not respond quickly to changes in the I/Q mismatch of the receiver front end 32. Accordingly, when it is desired to update the correction matrix (H) and/or the I/Q mismatch values $\Delta\phi$ and $\epsilon$, the method 500 repeats steps 502-508 for one of the DC offset levels for the A/D converters 50 and 52 (step 516). Thereafter, the differences of the covariances II, QQ, and IQ are high pass filtered (step 518). After filtering, the correction matrix (H) and/or the I/Q mismatch values $\Delta\phi$ and $\epsilon$ are computed using the equations given above (step 520). Thereafter, steps 516 through 520 may be repeated any time that it is desirable to update the correction matrix (H) and/or the I/Q mismatch values $\Delta\phi$ and $\epsilon$.

More specifically, it may be desirable to update the correction matrix (H) and/or the I/Q mismatch values $\Delta\phi$ and $\epsilon$ periodically to track temperature related drifts. Rather than starting the process from the beginning, the method 500, and particularly, steps 516-520 add new data samples to the old data samples. Initially, step 512 averages the differences of the covariances obtained in steps 502-510. As an example, steps 502-510 may be repeated for sixteen DC offset levels for each of the high and low gain settings. Thus, step 512 averages sixteen values for each of the differences $II_{DIF}$, $QQ_{DIF}$, and $IQ_{DIF}$. The following discussion illustrates one example for transitioning from the averaging mode of steps 502-512 to the filtering mode of steps 516-520. In this embodiment, the averaging is performed recursively. Thus, looking only at $II_{DIF}$, $$II_{AVG,1} = II_{DIF,1},$$

$$II_{AVG,2} = \frac{II_{DIF,2} + II_{DIF,1}}{2}$$

$$II_{AVG,3} = \frac{II_{DIF,3} + II_{DIF,2} + II_{DIF,1}}{3},$$

$$\ldots$$

$$II_{AVG,n} = \frac{II_{AVG,n-1}(n-1) + II_{DIF,n}}{n}.$$

After rearranging, $$II_{AVG,n} = II_{AVG,n-1} + \frac{II_{DIF,n} - II_{AVG,n-1}}{n}.$$

This last expression illustrates how to recursively compute the running average $II_{AVG,n}$ in step 512. However, for this recursive scheme, step 512 is within the loop of steps 502-508.

According to one embodiment of the present invention, the denominator n is frozen, or held constant, for steps 516-520 to transition to the filtering mode. The denominator n is frozen at some predetermined number such as its value at the completion of step 508. Thus, as an example, the denominator n may be frozen at 16. Accordingly, $$II_{AVG,n} = II_{AVG,n-1} + \frac{II_{DIF,n} - II_{AVG,n-1}}{16}.$$

After rearranging, $$II_{AVG,n} = \left(1 - \frac{1}{16}\right) II_{AVG,n-1} + \frac{II_{DIF,n}}{16}.$$

Looking back three iterations just for illustration provides:

$$II_{AVG,n} =$$
$$\left(1 - \frac{1}{16}\right)\left(\left(1 - \frac{1}{16}\right)\left(\left(1 - \frac{1}{16}\right) II_{AVG,n-3} + \frac{II_{DIF,n-2}}{16}\right) + \frac{II_{DIF,n-1}}{16}\right) + \frac{II_{DIF,n}}{16}.$$

Accordingly, when operating in the filtering mode, an Infinite Impulse Response (IIR) output is achieved. The latest measurement $II_{DIFF,n}$ is weighted by a factor of $\frac{1}{16}$. The measurement before that, $I_{DIF,n-1}$, is weighted by a factor of $(\frac{15}{16}) \times (\frac{1}{16})$. The measurement before that, $I_{DIF,n-2}$, is weighted by a factor of $(\frac{15}{16}) \times (\frac{15}{16}) \times (\frac{1}{16})$. Thus, older measurements contribute less and less as times passes, and steps 516-520 respond quickly to changes in the correction matrix (H) and/or the I/Q mismatch values $\Delta\phi$ and $\epsilon$.

Although the method 500 of FIG. 5 incorporates the high and low gain settings used to remove baseband noise, as discussed with respect to FIG. 4, the averaging scheme (steps 510 and 512) and the updating scheme that transitions from the averaging scheme to a filtering scheme (steps 516-520) are equally applicable to the method 300 of FIG. 3.

Any one of the methods shown in FIGS. 3-5 may also check for failure events. For example, the methods may check for insufficient noise. If the noise level seen at the input of the A/D converters 50 and 52 is not sufficiently above the quantization level of the A/D converters 50 and 52, then a failure is detected. For example, the RF noise level at the input of the A/D converters 50 and 52 may be low enough to cause only the least significant output bit to toggle, which would lead to erroneous results. In one embodiment, insufficient noise may be detected by comparing the sum of the variances II and QQ to a predetermined threshold. If the sum falls below the threshold, the data samples are rejected. In one embodiment, the rejected data samples include the one set of data samples obtained from the data buffers. An exemplary threshold is 4, but may vary depending on the particular implementation.

The methods may also check for saturation of the receiver front end 32. This may occur when a packet is received during calibration. In one embodiment, the methods may check for saturation by determining whether any data sample exceeds a predetermined gain dependent threshold. If a data sample exceeds the gain dependent threshold, then the entire buffer of data samples is rejected. The gain dependent threshold should be selected such that it is not too high, or otherwise, packets will pass though without detection. On the other hand, the gain dependent threshold should not be too low, or otherwise the threshold will favor a circular I versus Q trajectory, thereby masking the I/Q mismatch.

The methods may also detect when data samples are excessively rejected due to detection of saturation of the receiver front end 32. Excessive rejection may favor a circular I versus Q trajectory. More specifically, even though the data samples are compensated for drift, (i.e. low frequency noise), the I versus Q trajectory of the data samples may still shift due to residual low frequency noise. Since the rejection criterion has a circular symmetry, the buffers that are not rejected may fill a perfectly circular I versus Q trajectory defined by the rejection criterion. As a result, the I/Q mismatch may be hidden and erroneously computed to be zero. Thus, the methods may compare the percentage of buffers rejected to a predetermined threshold. As an example, the threshold may be ten percent. If the percentage of data samples or buffers of data samples rejected is greater than ten percent, an error is detected.

If the wireless modem 26 is operating based on the IEEE 802.11 standard, the methods may also operate to detect when it is likely that a Binary Phase Shift Keying (BPSK) packet has been received. A BPSK has a one dimensional I versus Q trajectory from the baseband perspective. As such, $I_R$ and $Q_R$ are essentially 100% correlated, which makes the covariance matrix nearly singular and therefore prone to numerical errors. Receipt of a BPSK packet, or another signal having a one dimensional I versus Q trajectory, may be detected by comparing $\sin(\Delta\phi)$ to a predetermined threshold. For example, if a 5 degree phase mismatch is expected when a BPSK packet is received for a particular implementation, a 2× margin may be used to set the predetermined threshold at sin(10 degrees), which is 0.17. If $\sin(\Delta\phi)$ is greater than the threshold, the entire buffer of data samples is rejected.

The methods may also detect when there is an insufficient difference in the RF noise for the high and low gain settings. This occurs when one or more of the differences $II_{DIF}$, $QQ_{DIF}$, or $IQ_{DIF}$ is below a predetermined threshold. Recall from above that the methods of FIGS. 4 and 5 compute the differences of the covariances $II_{DIF}$, $QQ_{DIF}$, or $IQ_{DIF}$ for a high and low gain setting of the LNA 42. The importance of the two gain setting is that the RF noise levels are different for the two gain settings. Accordingly, by subtracting the covariances for the low gain setting from the high gain setting, only the differences remain, and components due to baseband noise are cancelled out. However, if the RF noise level between the high and low gain settings is small, then the differences $II_{DIF}$, $QQ_{DIF}$, or $IQ_{DIF}$ are small, and errors are introduced into the computation of the correction matrix (H) and I/Q mismatch values. In one embodiment, an insufficient difference in the RF noise level is determined by computing $(II_{HH}+QQ_{LL})/(II_{LL}+QQ_{LL})$ and comparing the result to a predetermined threshold, such as 1.1. If the result is less than the predetermined threshold, an error is detected.

Those skilled in the art will recognize improvements and modifications to the preferred embodiments of the present invention. All such improvements and modifications are considered within the scope of the concepts disclosed herein and the claims that follow.

What is claimed is:

1. A method of calibrating for an I/Q mismatch of a receiver comprising:
receiving a random signal having a two-dimensional I versus Q trajectory;
calibrating for the I/Q mismatch of the receiver based on the random signal;
downconverting the random signal to a quadrature baseband signal having an in-phase component and a quadrature component, wherein calibrating for the I/Q mismatch comprises:
computing a variance of the in-phase component;
computing a variance of the quadrature component;
computing a covariance of the in-phase component with the quadrature component; and
computing a correction matrix that compensates for the I/Q mismatch based on the variance of the in-phase component, the variance of the quadrature component, and the covariance of the in-phase component with the quadrature component.

2. The method of claim 1 wherein the random signal is radio frequency noise.

3. The method of claim 1 wherein computing the correction matrix comprises computing the correction matrix (H) based on the equation:

$$H = \begin{pmatrix} \sqrt{QQ} & \frac{-IQ}{\sqrt{QQ}} \\ 0 & \sqrt{II - \frac{IQ^2}{QQ}} \end{pmatrix},$$

wherein II is the variance of the in-phase component, QQ is the variance of the quadrature component, and IQ is the covariance of the in-phase component with the quadrature component.

4. The method of claim 1 further comprising acquiring samples of the in-phase component and the quadrature component, wherein computing the variance of the in-phase component, computing the variance of the quadrature component, and computing the covariance of the in-phase component with the quadrature component are based on the samples of the in-phase component and the quadrature component.

5. The method of claim 4 further comprising compensating the samples for drift prior to computing the variance of the in-phase component, computing the variance of the quadrature component, and computing the covariance of the in-phase component with the quadrature component.

6. The method of claim 1 further comprising monitoring for at least one failure event based on the quadrature baseband signal, the variance of the in-phase component, the variance of the quadrature component, and the covariance of the in-phase component with the quadrature component.

7. The method of claim 1 wherein the receiver is a direct conversion receiver.

8. A method of calibrating for an I/Q mismatch of a receiver comprising:
receiving a random signal having a two-dimensional I versus Q trajectory;
calibrating for the I/Q mismatch of the receiver based on the random signal;
downconverting the random signal to a quadrature baseband signal having an in-phase component and a quadrature component, wherein calibrating for the I/Q mismatch comprises:
computing a variance of the in-phase component;
computing a variance of the quadrature component;
computing a covariance of the in-phase component with the quadrature component; and
computing the I/Q mismatch including a gain mismatch error and a phase mismatch error based on the variance of the in-phase component, the variance of the quadrature component, and the covariance of the in-phase component with the quadrature component.

9. The method of claim 8 wherein computing the I/Q mismatch comprises computing the gain mismatch error ($\epsilon$) and the phase mismatch error ($\Delta\phi$) based on the equations:

$$\varepsilon = 2 \cdot \frac{\sqrt{II} - \sqrt{QQ}}{\sqrt{II} + \sqrt{QQ}}, \text{ and}$$

$$\Delta\varphi = \text{Arcsin}\left(\frac{IQ}{\sqrt{II \cdot QQ}}\right),$$

wherein II is the variance of the in-phase component, QQ is the variance of the quadrature component, and IQ is the covariance of the in-phase component with the quadrature component.

10. The method of claim 8 further comprising acquiring samples of the in-phase component and the quadrature component, wherein computing the variance of the in-phase component, computing the variance of the quadrature component, and computing the covariance of the in-phase component with the quadrature component are based on the samples of the in-phase component and the quadrature component.

11. The method of claim 10 further comprising compensating the samples for drift prior to computing the variance of the in-phase component, computing the variance of the quadrature component, and computing the covariance of the in-phase component with the quadrature component.

12. A method of calibrating for an I/Q mismatch of a receiver comprising:
  receiving a random signal having a two-dimensional I versus Q trajectory;
  calibrating for the I/Q mismatch of the receiver based on the random signal;
  downconverting the random signal to a quadrature baseband signal having an in-phase component and a quadrature component, wherein calibrating for the I/Q mismatch comprises:
    varying a gain of an amplifier in the receiver from a high gain setting to a low gain setting;
    computing a variance of the in-phase component for the high gain setting and a variance of the in-phase component for the low gain setting;
    computing a variance of the quadrature component for the high gain setting and a variance of the quadrature component for the low gain setting;
    computing a covariance of the in-phase component with the quadrature component for the high gain setting and a covariance of the in-phase component with the quadrature component for the low gain setting;
    subtracting the variances of the in-phase component for the high gain setting and the low gain setting to provide a difference of the variances for the in-phase component;
    subtracting the variances of the quadrature component for the high gain setting and the low gain setting to provide a difference of the variances for the quadrature component;
    subtracting the covariances of the in-phase component with the quadrature component for the high gain setting and the low gain setting to provide a difference of the covariances of the in-phase component with the quadrature component; and
    computing a correction matrix that compensates for the I/Q mismatch based on the difference of the variances for the in-phase component, the difference of the variances for the quadrature component, and the difference of the covariances of the in-phase component with the quadrature component.

13. The method of claim 12 wherein computing the correction matrix comprises computing the correction matrix (H) based on the equation:

$$H = \begin{pmatrix} \sqrt{QQ_{DIF}} & \frac{-IQ_{DIF}}{\sqrt{QQ_{DIF}}} \\ 0 & \sqrt{II_{DIF} - \frac{IQ_{DIF}^2}{QQ_{DIF}}} \end{pmatrix},$$

wherein $II_{DIF}$ is the difference of the variances of the in-phase component for the high gain setting and the low gain setting, $QQ_{DIF}$ is the difference of the variances of the quadrature component for the high gain setting and the low gain setting, and $IQ_{DIF}$ is the difference of the covariances of the in-phase component with the quadrature component for the high gain setting and the low gain setting.

14. A method of calibrating for an I/Q mismatch of a receiver comprising:
  receiving a random signal having a two-dimensional I versus Q trajectory;
  calibrating for the I/Q mismatch of the receiver based on the random signal;
  downconverting the random signal to a quadrature baseband signal having an in-phase component and a quadrature component, wherein calibrating for the I/Q mismatch comprises:
    varying a gain of an amplifier in the receiver from a high gain setting to a low gain setting;
    computing a variance of the in-phase component for the high gain setting and a variance of the in-phase component for the low gain setting;
    computing a variance of the quadrature component for the high gain setting and a variance of the quadrature component for the low gain setting;
    computing a covariance of the in-phase component with the quadrature component for the high gain setting and a covariance of the in-phase component and the quadrature component for the low gain setting;
    subtracting the variances of the in-phase component for the high gain setting and the low gain setting to provide a difference of the variances for the in-phase component;
    subtracting the variances of the quadrature component for the high gain setting and the low gain setting to provide a difference of the variances for the quadrature component;
    subtracting the covariances of the in-phase component with the quadrature component for the high gain setting and the low gain setting to provide a difference of the covariances of the in-phase component with the quadrature component; and
    computing the I/Q mismatch including a gain mismatch error and a phase mismatch error based on the difference of the variances for the in-phase component, the difference of the variances for the quadrature component, and the difference of the covariances of the in-phase component with the quadrature component.

15. The method of claim 14 wherein computing the I/Q mismatch comprises computing the gain mismatch error ($\epsilon$) and the phase mismatch error ($\Delta\phi$) based on the equations:

$$\varepsilon = 2 \cdot \frac{\sqrt{II_{DIF}} - \sqrt{QQ_{DIF}}}{\sqrt{II_{DIF}} + \sqrt{QQ_{DIF}}}, \text{ and}$$

$$\Delta\varphi = \text{Arcsin}\left(\frac{IQ_{DIF}}{\sqrt{II_{DIF} \cdot QQ_{DIF}}}\right).$$

wherein $II_{DIF}$ is the difference of the variances of the in-phase component for the high gain setting and the low gain setting, $QQ_{DIF}$ is the difference of the variances of the quadrature component for the high gain setting and the low gain setting, and $IQ_{DIF}$ is the difference of the covariances of the in-phase component with the quadrature component for the high gain setting and the low gain setting.

16. A method of calibrating for an I/Q mismatch of a receiver comprising:

receiving a random signal having a two-dimensional I versus Q trajectory, wherein receiving the random signal further comprises providing analog-to-digital conversion circuitry for digitizing a quadrature baseband signal;

calibrating for the I/Q mismatch of the receiver based on the random signal;

downconverting the random signal to the quadrature baseband signal having an in-phase component and a quadrature component, wherein calibrating for the I/Q mismatch comprises:

setting a DC offset level associated with analog-to-digital conversion circuitry to a first DC offset level;

computing a variance of the in-phase component;

computing a variance of the quadrature component;

computing a covariance of the in-phase component with the quadrature component;

repeating the steps of setting the DC offset level, computing a variance of the in-phase component, computing a variance of the quadrature component, and computing a covariance of the in-phase component with the quadrature component for each of a plurality of DC offset levels including the first DC offset level;

averaging the variances of the in-phase component to provide an average variance of the in-phase component;

averaging the variances of the quadrature component to provide an average variance of the quadrature component;

averaging the covariances of the in-phase component with the quadrature component to provide an average covariance of the in-phase component with the quadrature component; and computing a correction matrix that compensates for the I/Q mismatch based on the average variance of the in-phase component, the average variance of the quadrature component, and the average covariance of the in-phase component with the quadrature component.

17. A method of calibrating for an I/Q mismatch of a receiver comprising:

receiving a random signal having a two-dimensional I versus Q trajectory, wherein receiving the random signal further comprises providing analog-to-digital conversion circuitry for digitizing a quadrature baseband signal;

calibrating for the I/Q mismatch of the receiver based on the random signal;

downconverting the random signal to the quadrature baseband signal having an in-phase component and a quadrature component, wherein calibrating for the I/Q mismatch comprises:

setting a DC offset level associated with analog-to-digital conversion circuitry to a first DC offset level;

computing a variance of the in-phase component;

computing a variance of the quadrature component;

computing a covariance of the in-phase component with the quadrature component;

repeating the steps of setting the DC offset level, computing a variance of the in-phase component, computing a variance of the quadrature component, and computing a covariance of the in-phase component and the quadrature component for each of a plurality of DC offset levels including the first DC offset level;

averaging the variances of the in-phase component to provide an average variance of the in-phase component;

averaging the variances of the quadrature component to provide an average variance of the quadrature component;

averaging the covariances of the in-phase component with the quadrature component to provide an average covariance of the in-phase component with the quadrature component; and computing the I/Q mismatch including a gain mismatch error and a phase mismatch error based on the average variance of the in-phase component, the average variance of the quadrature component, and the average covariance of the in-phase component with the quadrature component.

18. A method of calibrating for an I/Q mismatch of a receiver comprising:

receiving a random signal having a two-dimensional I versus Q trajectory, wherein receiving the random signal further comprises providing analog-to-digital conversion circuitry for digitizing a quadrature baseband signal;

calibrating for the I/Q mismatch of the receiver based on the random signal;

downconverting the random signal to the quadrature signal having an in-phase component and a quadrature component, wherein calibrating for the I/Q mismatch comprises:

setting a DC offset level associated with analog-to-digital conversion circuitry to a first DC offset level;

varying a gain of an amplifier in the receiver from a high gain setting to a low gain setting;

computing a variance of the in-phase component for the high gain setting and a variance of the in-phase component for the low gain setting;

computing a variance of the quadrature component for the high gain setting and a variance of the quadrature component for the low gain setting;

computing a covariance of the in-phase component with the quadrature component for the high gain setting and a covariance of the in-phase component with the quadrature component for the low gain setting;

subtracting the variances of the in-phase component for the high gain setting and the low gain setting to provide a difference of the variances for the in-phase component;

subtracting the variances of the quadrature component for the high gain setting and the low gain setting to provide a difference of the variances for the quadrature component;

subtracting the covariances of the in-phase component with the quadrature component for the high gain setting and the low gain setting to provide a difference of the covariances of the in-phase component and the quadrature component;

repeating the steps of setting the DC offset level, varying the gain of the amplifier, computing a variance of the in-phase component, computing a variance of the quadrature component, computing a covariance of the in-phase component with the quadrature component, subtracting the variances of the in-phase component, subtracting the variances of the quadrature component, and subtracting the covariances of the in-phase component with the quadrature component for each of a plurality of DC offset levels including the first DC offset level;

averaging the differences of the variances of the in-phase component to provide an average difference of the variances of the in-phase component;

averaging the differences of the variances of the quadrature component to provide an average difference of the variances of the quadrature component;

averaging the differences of the covariances of the in-phase component with the quadrature component to provide an average difference of the covariances of the in-phase component with the quadrature component; and computing a correction matrix that compensates for the I/Q mismatch based on the average difference of the variances for the in-phase component, the average difference of the variances for the quadrature component, and the average difference of the covariances of the in-phase component with the quadrature component.

19. The method of claim 18 further comprising updating the correction matrix.

20. The method of claim 19 wherein updating the correction matrix comprises:

repeating the steps of setting the DC offset level, varying the gain of the amplifier, computing a variance of the in-phase component, computing a variance of the quadrature component, computing a covariance of the in-phase component with the quadrature component, subtracting the variances of the in-phase component, subtracting the variances of the quadrature component, and subtracting the covariances of the in-phase component with the quadrature component for one of the plurality of DC offset levels;

filtering the differences of the variances of the in-phase component to provide a filtered difference of the variances of the in-phase component;

filtering the differences of the variances of the quadrature component to provide a filtered difference of the variances of the quadrature component;

filtering the differences of the covariances of the in-phase component and the quadrature component to provide a filtered difference of the covariances of the in-phase component with the quadrature component; and computing an updated correction matrix that compensates for the I/Q mismatch based on the filtered difference of the variances for the in-phase component, the filtered difference of the variances for the quadrature component, and the filtered difference of the covariances of the in-phase component with the quadrature component.

21. A method of calibrating for an I/Q mismatch of a receiver comprising:

receiving a random signal having a two-dimensional I versus Q trajectory, wherein receiving the random signal further comprises providing analog-to-digital conversion circuitry for digitizing a quadrature baseband signal;

calibrating for the I/Q mismatch of the receiver based on the random signal;

downconverting the random signal to the quadrature baseband signal having an in-phase component and a quadrature component, wherein calibrating for the I/Q mismatch comprises:

setting a DC offset level associated with analog-to-digital conversion circuitry to a first DC offset level;

varying a gain of an amplifier in the receiver from a high gain setting to a low gain setting;

computing a variance of the in-phase component for the high gain setting and a variance of the in-phase component for the low gain setting;

computing a variance of the quadrature component for the high gain setting and a variance of the quadrature component for the low gain setting;

computing a covariance of the in-phase component with the quadrature component for the high gain setting and a covariance of the in-phase component and the quadrature component for the low gain setting;

subtracting the variances of the in-phase component for the high gain setting and the low gain setting to provide a difference of the variances for the in-phase component;

subtracting the variances of the quadrature component for the high gain setting and the low gain setting to provide a difference of the variances for the quadrature component;

subtracting the covariances of the in-phase component with the quadrature component for the high gain setting and the low gain setting to provide a difference of the covariances of the in-phase component and the quadrature component;

repeating the steps of setting the DC offset level, varying the gain of the amplifier, computing a variance of the in-phase component, computing a variance of the quadrature component, computing a covariance of the in-phase component with the quadrature component, subtracting the variances of the in-phase component, subtracting the variances of the quadrature component, and subtracting the covariances of the in-phase component with the quadrature component for each of a plurality of DC offset levels including the first DC offset level;

averaging the differences of the variances of the in-phase component to provide an average difference of the variances of the in-phase component;

averaging the differences of the variances of the quadrature component to provide an average difference of the variances of the quadrature component;

averaging the differences of the covariances of the in-phase component with the quadrature component to provide an average difference of the covariances of the in-phase component with the quadrature component; and computing the I/Q mismatch including a gain mismatch error and a phase mismatch error based on the average difference of the variances for the in-phase component, the average difference of the variances for the quadrature component, and the average difference of the covariances of the in-phase component with the quadrature component.

22. The method of claim 21 further comprising updating the correction matrix.

23. The method of claim 22 wherein updating the correction matrix comprises:

repeating the steps of setting the DC offset level, varying the gain of the amplifier, computing a variance of the in-phase component, computing a variance of the quadrature component, computing a covariance of the in-phase component with the quadrature component, subtracting the variances of the in-phase component, subtracting the variances of the quadrature component, and subtracting the covariances of the in-phase component with the quadrature component for one of the plurality of DC offset levels;

filtering the differences of the variances of the in-phase component to provide a filtered difference of the variances of the in-phase component;

filtering the differences of the variances of the quadrature component to provide a filtered difference of the variances of the quadrature component;

filtering the differences of the covariances of the in-phase component with the quadrature component to provide a filtered difference of the covariances of the in-phase component with the quadrature component; and computing an updated I/Q mismatch including an updated gain mismatch error and an updated phase mismatch error based on the filtered difference of the variances for the in-phase component, the filtered difference of the variances for the quadrature component, and the filtered difference of the covariances of the in-phase component with the quadrature component.

24. A system for calibrating for an I/Q mismatch of a receiver comprising:

a receiver adapted to receive a random signal having a two-dimensional I versus Q trajectory and process the random signal to provide a quadrature signal corresponding to the random signal; and processing circuitry adapted to:

calibrate for the I/Q mismatch of the receiver based on the quadrature signal;

downconverting the random signal to a quadrature baseband signal having an in-phase component and a quadrature component;

compute a variance of the in-phase component;

compute a variance of the quadrature component;

compute a covariance of the in-phase component with the quadrature component; and compute a correction matrix that compensates for the I/Q mismatch based on the variance of the in-phase component, the variance of the quadrature component, and the covariance of the in-phase component with the quadrature component.

* * * * *